UNITED STATES PATENT OFFICE.

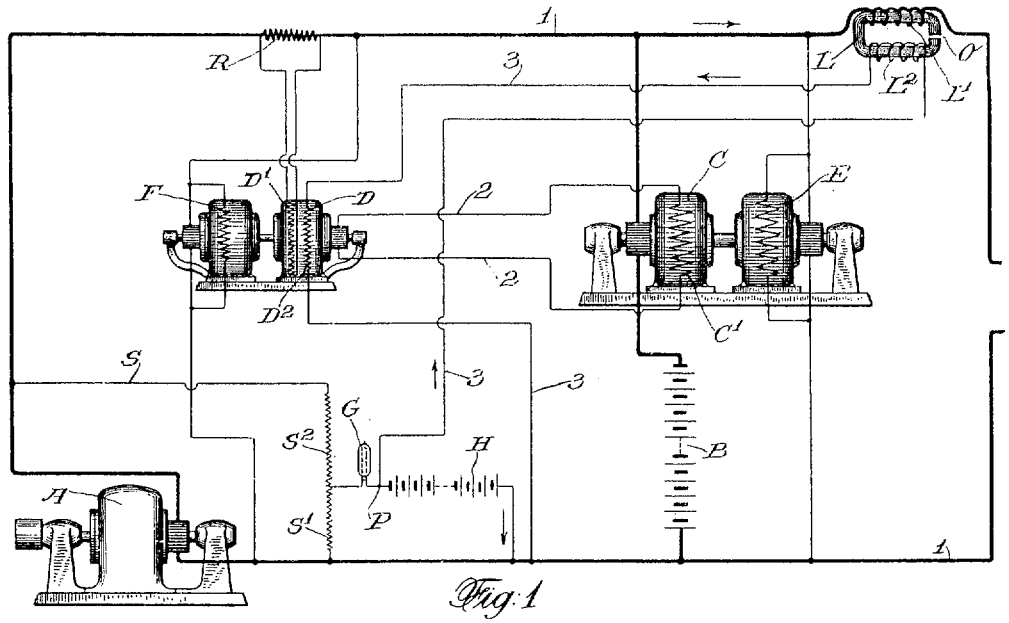

ALBERT S. HUBBARD, OF BELLEVILLE, NEW JERSEY, ASSIGNOR TO GOULD STORAGE BATTERY COMPANY, A CORPORATION OF NEW YORK.

ELECTRICAL SYSTEM OF DISTRIBUTION.

976,878. Specification of Letters Patent. Patented Nov. 29, 1910.

Application filed June 19, 1908. Serial No. 439,293.

*To all whom it may concern:*

Be it known that I, ALBERT S. HUBBARD, a citizen of the United States, and a resident of Belleville, county of Essex, and State of New Jersey, have invented certain new and useful Improvements in Electrical Systems of Distribution, of which the following is a specification.

My invention relates to electrical systems of distribution and more especially to systems in which a regulating apparatus is employed to steady the load upon the main generator or source of electrical energy.

Some of the objects of my invention are to provide an arrangement whereby the lag in such regulating apparatus may be materially cut down, and said regulating apparatus be made to operate more quickly responsive to changes in the electrical condition of such systems and also to provide means whereby the effects of a varying line voltage are minimized.

In systems in which a battery and booster and an exciting dynamo for such booster, are used, the regulation is often seriously interfered with because of the self-induction and transformer action in the exciter or other regulating dynamo. This self-induction and transformer action causes the machines to be tardy in responding to line variations and forces the main generator to take considerable fluctuations in load. The more rapid the line variations the greater is the self-induction and transformer action and hence the greater the fluctuations imposed upon the main generator.

I have applied my invention in connection with a regulating dynamo having a field winding subject to the fluctuations of the distribution circuit and an opposing field winding. This opposing field coil is connected to a substantially constant source of electromotive force so that when the system is operating under normal conditions the magneto-motive force produced by said coils neutralize each other and no current is furnished by the exciter. I also connect to said second mentioned field coil the secondary of a transformer, the primary of which is located in the main circuit of the system. This transformer is so connected that when an increase of current falls upon the system the voltage produced in its secondary acts to cut down the current in the coil connected to it, and a decrease of current on the system acts to increase the current in said coil. The regulating action of the exciter depends upon the difference in the strength of these two coils and the self-induction in the main regulating coil retards its action and its mutual induction or transformer action upon the opposing coil tends to cause a change of current therein in the direction not desired causing further retardation. This retardation, however, is compensated for by the action of the opposing coil connected to the transformer and hence any variations on the main circuit are immediately felt in the armature of the exciter and the whole regulating apparatus is made quickly responsive.

Further and more specific features of my invention will clearly appear from the detailed description given below taken in connection with the accompanying drawing, in which—

Figure 1, shows a system embodying one form of my invention and Fig. 2 is a modification thereof.

Referring to Fig. 1, A represents a direct current generator, supplying the distribution circuit 1, 1. Connected across said circuit is a battery B and in series therewith a booster, C, provided with a field coil, C'. The field coil C' is fed by a circuit 2, 2, connected to the armature of an exciting dynamo, D. The exciting dynamo D is provided with opposing field coils D' and $D^2$, the coil D' being connected in shunt with a resistance, R in the distribution circuit. Connected across the circuit 1, 1, is a resistance S composed of two parts S' and $S^2$ and where the parts S' and $S^2$ join each other there is connected one terminal of a resistance, G. The resistance G is of such a character that with certain increases of current therein the value of the resistance increases very rapidly. Iron wire is found to possess these properties and is preferably used inclosed in a glass bulb. To the other terminal of the resistance G is connected one end of an auxiliary battery H, the other end of which is connected to one of the mains, 1. At the point of junction, P, of the resistance G and battery H is connected an auxiliary circuit, 3, which has therein, in series, the field coil $D^2$ and the secondary $L^2$ of a transformer L. The primary, L', of said transformer is placed in series in the main circuit, 1, 1, and the other end of the circuit 3 is connected to one of the mains, 1. A shunt motor, E, is provided for driving the booster C and another shunt motor F is provided for driving the exciter D, both of said motors being connected across the mains, 1, 1.

In the present instance the drop of potential in resistance $S^2$ is such as to leave the drop in resistance $S'$ approximately 65 volts. The drop across the resistance G is about 15 volts. The auxiliary battery H is provided of such a size that, under normal conditions, it will receive a small charging current. If the voltage across the resistance $S'$ rises and tends to force a larger current through the resistance G, this resistance markedly increases in value thereby causing an increase in drop therein and causing the voltage at the junction P to remain practically constant. A decrease in voltage across $S'$ does not materially affect the voltage at the junction P since in such a case the battery H upholds the voltage to the desired value. The field coil $D^2$ is therefore connected to a substantially constant source of electromotive force.

Under normal conditions the magneto-motive force produced by the coils $D'$ and $D^2$ is the same and hence the exciter will furnish no current to the circuit 2, 2, and the field $C'$, and the booster will run idly allowing the battery to float across the mains, 1, 1. If, however, an increase of load falls upon the circuit, 1, 1, the voltage at the terminals of the coil $D'$ is increased, which tends to increase the magneto-motive force produced by said coil and set up a resultant field flux in the exciter. Thereupon the exciter furnishes a current to the circuit, 2, 2, and field $C'$ causing the booster C to generate an electromotive force in the proper direction to cause the battery B to discharge and take the extra load imposed upon the distribution circuit. If a decrease in load occurs the magneto-motive force of coil $D'$ is decreased causing the exciter to furnish a current in the opposite direction and the booster to generate an electromotive force in the proper direction to cause the battery, B, to be charged and increase the load on the system.

As has already been stated when an increase in load falls upon the circuit, 1, 1, the voltage at the terminals of the field coil $D'$ is increased which tends to increase the magneto-motive force produced by this coil and cause the exciter to furnish the booster C with the proper regulating current. This increase in magneto-motive force, however, is much retarded by the self-induction or back electromotive force of the coil and its mutual induction or transformer action on the opposing coil $D^2$ and the resulting flux produced is not large enough to produce a regulating exciting current of the proper size. In order to increase this flux, the magneto-motive force of the opposing coil $D^2$ is cut down by cutting down its current or the voltage applied thereto. This is effected by the transformer L, which, upon an increase of current in the distribution circuit has an electromotive force set up in its secondary which opposes the electromotive force applied to the coil $D^2$ and causes a decrease in its magneto-motive force. Thus the lag due to self-induction and mutual induction of the coil $D'$ is fully compensated for by the decrease of magneto-motive force of the coil $D^2$ and the exciter D immediately responds and furnishes the proper regulating current to the booster C. Similarly, when a decrease of load occurs the electromotive force produced in the secondary $L^2$ causes the magneto-motive force in coil $D^2$ to be increased and thus compensate for the lagging of coil $D'$ in decreasing its magneto-motive force. The more rapid the change of load upon the distribution circuit, the more rapid and greater the action of the transformer secondary $L^2$ thus causing the flux produced by coil $D^2$ to be responsive to the rate of change of the load or current in the distribution circuit and to always increase or decrease to properly compensate for the lag in the coils $D'$ and $D^2$.

In Fig. 2, I have shown a modification of the system shown in Fig. 1. In Fig. 2 the arrangement is substantially the same, with the exception that the secondary $L^2$ of the transformer, instead of being in the circuit 3, directly in series with the coil $D^2$, is placed in a circuit 4, directly in series with the auxiliary battery, H. In each case the normal flow of current may be represented as being in the direction shown by the arrows. In Fig. 1, the currents in the transformer coils $L'$ and $L^2$ are therefore opposite in direction (as shown by the arrows) and both tend to set up a flux in the same direction in the transformer L. This, of course, greatly increases the flux density of the transformer and tends to saturate it. In order to prevent the transformer from becoming saturated and unresponsive, a relatively large air gap, O, is inserted in its magnetic path. In Fig. 2, as shown on the drawing, the normal currents in the coils $L'$ and $L^2$ flow in the same general direction, (as shown by the arrows) and the current in coil $L^2$ is much smaller and the flux produced by one coil opposes the flux produced by the other coil. Hence the resulting flux is small and there is no danger of the transformer becoming saturated and unresponsive and a much smaller air gap, $O'$ may be used.

Although I have shown particular arrangements of my improvements, I do not desire to be limited thereto, but

What I claim and desire to secure by Letters Patent, is:

1. In an electrical system of distribution, the combination of a distribution circuit, a booster and battery, connected thereto, a transformer in said circuit, an exciter for said booster provided with two field coils, one of said coils having a current varying in intensity with the current of said circuit, the other of said coils normally producing a substantially constant magnetomotive force and being connected to said transformer.

2. In an electrical system of distribution, the combination of a distribution circuit, a booster and a storage apparatus connected thereto, induction apparatus in said circuit, a regulating dynamo for said booster provided with two opposing field coils, one of said coils being arranged to have a current varying in intensity with the current of the system and the other of said coils normally producing a substantially constant magnetomotive force and being connected to said induction apparatus.

3. In an electrical system of distribution, the combination of a distribution circuit, a booster connected thereto, induction apparatus in said circuit, an exciter for said booster, provided with two field coils, one of said coils being arranged to have a current varying in intensity with the load on said circuit and the other of said coils being arranged to be normally excited by a substantially constant current and being connected to said induction apparatus.

4. In an electrical system of distribution, the combination of a direct current distribution circuit, a booster connected thereto, a regulating dynamo for said booster, provided with two field coils the magneto-motive force of one of which varies as the load on the system and the magneto-motive force of the other of which varies as the rate of change of said load.

5. In an electrical system of distribution, the combination of a distribution circuit, a battery and booster connected thereto, an induction apparatus in said circuit, a regulating dynamo for said booster provided with two field coils the magneto-motive force of one of which varies as the current in said circuit and the other of which is connected to said induction apparatus and the magneto-motive force of which varies as the rate of change of said load.

6. In an electrical system of distribution, the combination of a direct current distribution circuit, a transformer in operative relation thereto, a regulating dynamo for said booster provided with opposing field coils the magneto-motive force of one of which varies as the load on said circuit and the other of which is connected to the secondary of said transformer and the magneto-motive force of which varies as the rate of change of said load.

7. In an electrical system of distribution, the combination of a direct current distribution circuit, a booster and induction apparatus in operative relation thereto, an exciter for said booster provided with two opposing field coils, one of which is connected to said induction apparatus and the magneto-motive force of which varies as the rate of change of current in said circuit and the magneto-motive force of the other of which varies as said current.

8. In an electrical system of distribution, the combination of a distribution circuit, a booster and a regulating dynamo in operative relation to said circuit, a field coil for said dynamo arranged to produce a magneto-motive force which varies with the load of the system, another field coil for said dynamo arranged to normally produce a substantially constant magneto-motive force, and induction apparatus in said circuit for causing the magneto-motive force of said last mentioned coil to vary as the rate of change of said load.

9. In an electrical system of distribution, the combination of a direct current distribution circuit, a substantially constant source of electromotive force a battery and booster connected to the circuit, an exciter for said booster, a field coil for said exciter arranged to produce a magneto-motive force which varies with the current of the system, an opposing field coil for said exciter connected to the substantially constant source of electromotive force, means connected to said circuit for causing the magneto-motive force of said last mentioned coil to vary as the rate of change of said current, and means for driving said booster and exciter.

10. In an electrical system of distribution, the combination of a direct current distribution circuit, a resistance connected across said circuit, a regulating dynamo provided with two field coils, one of which is connected to a point in said resistance and means for causing the magneto-motive force of said coil to vary responsive to changes in the load on said circuit.

11. In an electrical system of distribution, the combination of a direct current distribution circuit, a resistance connected across said circuit, a conductor connected to a point in said resistance, said conductor having a resistance markedly varying with certain changes of current therein, a regulating dynamo provided with field coils, one of which is connected to said conductor, and means for causing the magneto-motive force of said coil to vary responsive to changes in the load on the system.

12. In an electrical system of distribution, the combination of a direct current distribution circuit, a booster and battery connected to said circuit, a resistance connected to said circuit, an auxiliary battery, a regulating dynamo provided with field coils, one of said coils being connected to said resistance and to said auxiliary battery, and means for causing the magneto-motive force of said coil to vary responsive to changes in the load on said circuit.

13. In an electrical system of distribution, the combination of a direct current distribution circuit, a resistance connected across said circuit, a battery and booster connected to said circuit, an auxiliary battery, a regulating dynamo provided with opposing field coils, the magneto-motive force of one of said coils being arranged to vary with the current of the system and the other of said coils being connected to said resistance and to said auxiliary battery, and an induction device for causing the magneto-motive force of said last mentioned coil to vary responsive to the rate of change of said current.

14. In an electrical system of distribution, the combination of a source of electro-motive force a distribution circuit, a storage apparatus in operative relation thereto, a regulating dynamo therefor, provided with opposing field coils, one of said coils being connected to normally produce a substantially constant magneto-motive force, a choking device connected to said source, and means for causing the magneto-motive force of said coil to vary responsive to load changes on the system.

15. In an electrical system of distribution, the combination of a distribution circuit, a battery and booster connected thereto, a resistance connected across said circuit, an auxiliary battery connected to a point in said resistance, a choking device in series therewith, an exciter for said booster provided with opposing field coils, the magneto-motive force of one of which varies responsively to current changes in the system, and the other of which is connected to said choking device and means for causing the magneto-motive force of said last mentioned coil to vary responsively to the rate of change of said current.

16. In an electrical system of distribution, the combination of a direct current distribution circuit, a battery and booster connected thereto, an exciter for said booster, means for causing the field flux of said exciter to vary responsive to current variations on said circuit, means for also causing said flux to vary responsively to the rate of change of said current, and means for driving said exciter and booster.

17. In an electrical system of distribution, the combination of a direct current distribution circuit and booster therefor, an induction apparatus connected to be responsive to changes in the electrical condition of the system, a regulating dynamo for the booster and provided with two field coils, one of which is connected to be responsive to changes in the electrical condition of the system and the other of which is connected to said induction apparatus to be responsive to the rate of change of electrical conditions of the system, said coils being normally opposed but acting to aid one another responsive to changes in the electrical condition of the system.

18. In an electrical system of distribution, the combination of a direct current distribution circuit a transformer operatively related thereto, a booster, an exciter for said booster provided with a field coil the current in which varies responsively to changes in the current of said circuit, an auxiliary coil operatively related to the transformer for reducing the self-induction effect in said first mentioned coil, and connections between said booster and exciter.

19. In an electrical system of distribution, the combination of a direct current generator, a direct current distribution circuit connected thereto, a storage battery and booster connected across said circuit, a resistance connected across said circuit a direct current choking device in operative relation therewith, an auxiliary battery connected to a point in said resistance through the direct current choking device, an exciter for said booster provided with opposing field coils, one of which is connected to said distribution circuit and has a current which varies with the current in said circuit, and the other of which is connected to said choking device, a transformer in said distribution circuit having its secondary connected to said last mentioned field coil to cause it to reduce the self-induction effect in said exciter and means for driving said booster and said exciter.

20. In an electrical system of distribution, the combination of a direct current distribution circuit, a booster therefor, a regulating dynamo for the booster, a resistance connected across said circuit, a storage battery having one terminal connected to one side of said circuit and the other terminal connected to a point in said resistance, said regulating dynamo being provided with two field coils one of which is connected to be responsive to load changes on the system and the other of which is connected across the battery.

21. In an electrical system of distribution, the combination of a direct current distribution circuit, a booster therefor, a regulating dynamo for the booster, a resistance connected across said circuit, a storage battery having one terminal connected to one side of said circuit and the other terminal connected to a point in said resistance, said regulating dynamo being provided with two field coils one of which is connected to be responsive to load changes on the system and the other of which is connected across the battery, and a high temperature coefficient resistance connected in circuit with the battery between the battery and said point.

22. In an electrical system of distribution, the combination of a direct current distribution circuit, a booster therefor, a regulating dynamo for the booster, a resistance connected across said circuit, a storage battery having one terminal connected to one side of said circuit and the other terminal connected to a point in said resistance, said regulating dynamo being provided with two field coils, one of which is connected to be responsive to load changes on the system and the other of which is connected across the battery, and a high temperature coefficient resistance connected in circuit with the battery between the battery and said point, a transformer having its primary operatively related to said first mentioned circuit and its secondary operatively related to said second mentioned field coil so that it is responsive to the rate of change of load of said first mentioned circuit.

In testimony whereof, I have signed my name to this specification, in the presence of two subscribing witnesses.

ALBERT S. HUBBARD.

Witnesses:
RICHARD EYRE,
EDWIN SEGER.